Nov. 10, 1936.  W. H. GOODMAN  2,060,196
GRAVITY COMPENSATING HITCH
Filed May 9, 1934   2 Sheets-Sheet 1
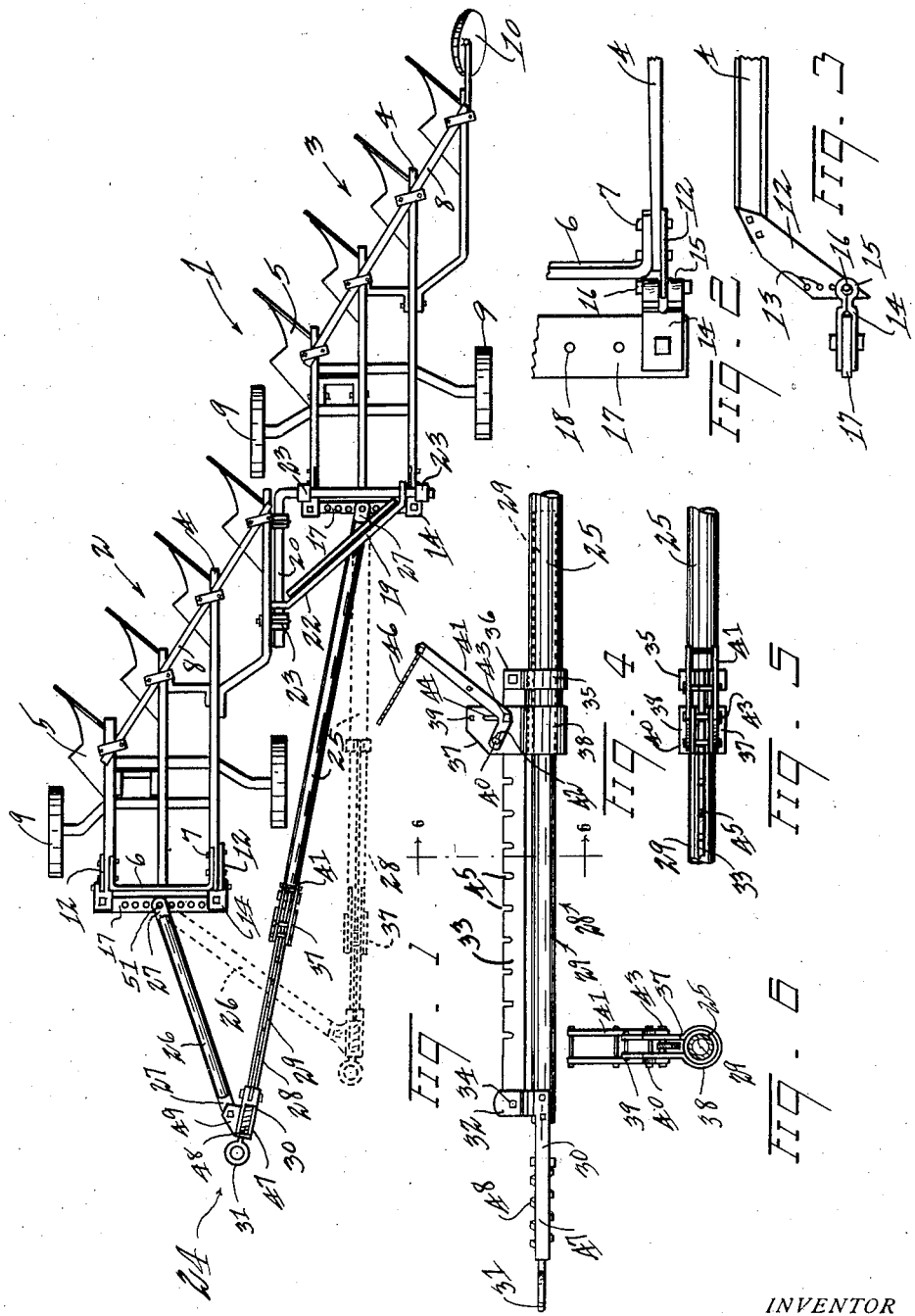
INVENTOR
Wade H. Goodman
BY
E. Sauzé  ATTORNEY

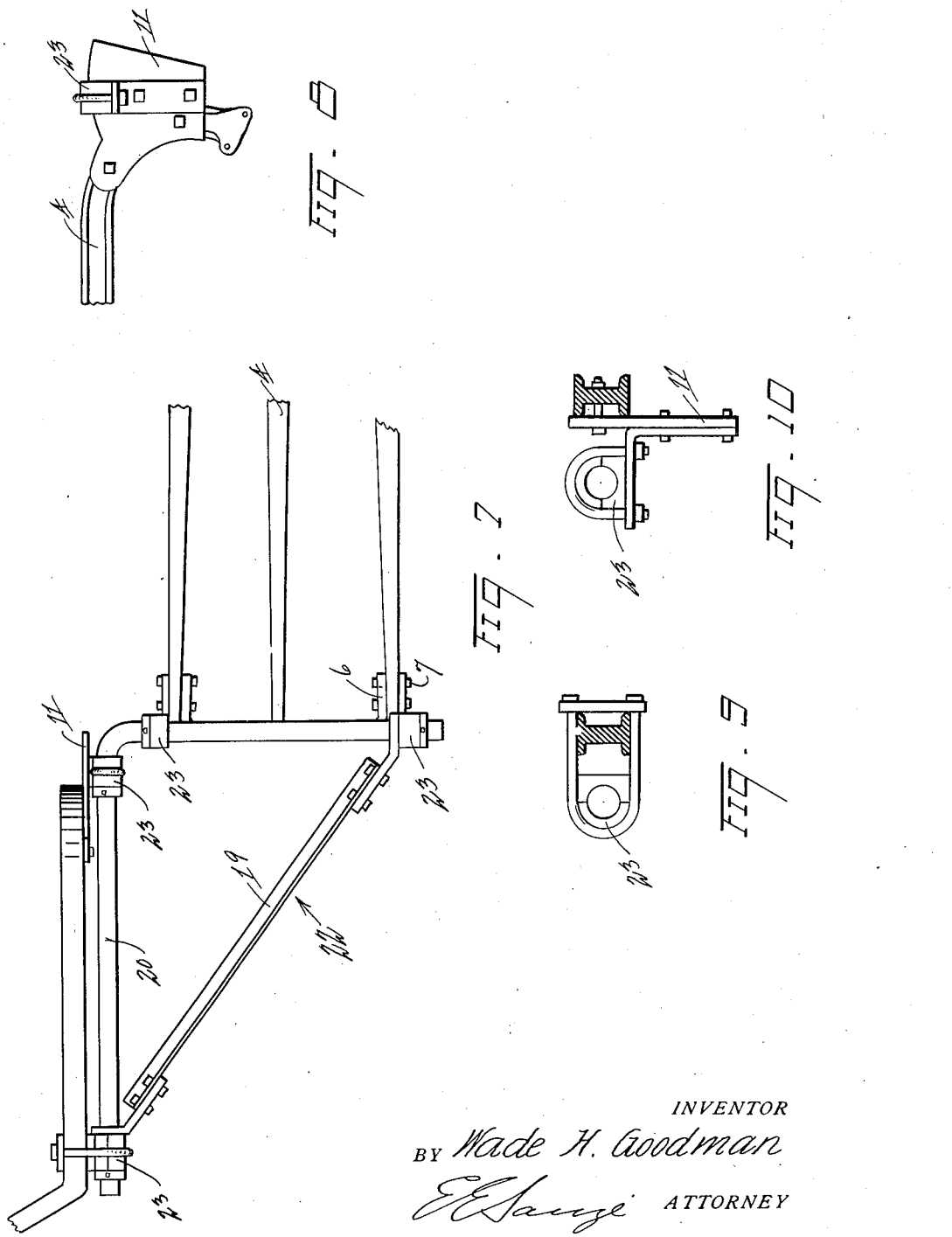

Patented Nov. 10, 1936

2,060,196

UNITED STATES PATENT OFFICE 2,060,196

GRAVITY COMPENSATING HITCH

Wade H. Goodman, Walla Walla, Wash., assignor to Amery & Sons, Inc., Walla Walla, Wash.

Application May 9, 1934, Serial No. 724,730

3 Claims. (Cl. 97—77)

This invention relates to gravity compensating hitches, more particularly adapted to power drawn implements in which it is customary to provide a single implement by the assemblage of several, or a plurality of units, extended in operative alignment to form such implement.

The invention has for one of its objects to provide a hitch that will compensate for the effect of gravity induced by sloping ground by providing such rotative movement of the implement as may be necessary to maintain the implement in its true course.

Another object of the invention is to provide a gravity compensating hitch that by a novel method of adjustment will tend to direct the implement against the effect of gravity influence rather than the hitch itself.

A further object of the invention is to provide a gravity compensating hitch that is relatively light in weight, which may be cheaply constructed, and which will be extremely efficient in operation.

With these and other objects in view reference is now had to the accompanying drawings in which Fig. 1 is a plan view of the hitch shown attached to an implement;

Fig. 2 is a detail plan view thereof showing a method of mounting the adjusting bar;

Fig. 3 is a detail vertical view further showing the method of mounting the adjusting bar;

Fig. 4 is a side elevation of the length adjusting means, its lock and draft ring;

Fig. 5 is a plan view of the lock;

Fig. 6 is an end elevation of the lock taken on the line 6—6 of Fig. 4, enlarged;

Fig. 7 is an enlarged plan view of the compound coupling;

Fig. 8 is a side elevation of a rear journal support;

Fig. 9 is a rear elevation of a front journal support; and

Fig. 10 is a rear elevation of the rear journal support.

Having reference to the drawings like numerals refer to like parts throughout the several views and the numeral 1 refers to what will be termed the implement, in these specifications, and which will consist of any number of units to which the device is applicable within the limits of reason, and in this case the forward unit will be designated by the numeral 2 while the rear unit will be designated by the numeral 3, both units being represented in the drawings by gang plows.

These units consist of goosenecks 4 to which plow bottoms 5 are fastened in the usual manner, and provide a frame by the goosenecks which are extended forward to be joined together at their forward end by a tie member 6 secured thereto by bolts 7, and at their rear by a diagonal member 8 secured in a similar manner to form said frame.

The units are supported by vehicle wheels 9 positioned ahead of the plow bottoms and where a single unit may constitute the complete implement, will be provided with the usual caster wheel 10 attached to the rear gooseneck by means of a depending caster wheel plate 11 secured to that member in any approved manner.

Where a plurality of units constitute the implement the draft will be lightened by the removal of all intermediate caster wheels as only the rear unit 3 will require a caster wheel and the forward units 2 will then be supported, in a manner to be explained.

Attached to the forward end of the front and rear units and to the extended portion of the outside two goosenecks are depending plates 12 provided with vertically positioned adjusting holes 13 and a loop 14 formed of a strap of metal is slotted and bent to provide an eye 15 that straddles the said plate 12 to which it is adjustably secured by a pin 16 or bolt, the ends of the loop 14 being spaced apart to receive an adjusting bar 17 consisting of a flat plate extended laterally to be secured by the said loops at both of its ends and in which there is provided extra holes 18 for the usual adjustment purposes.

From the above it is apparent that the adjusting bar 17 is susceptible of a rocking movement in a vertical plane, the purpose of which being to permit free movement of the hitch, to be described.

For efficient operation it is equally as essential that the implement 1 whether composed of a single unit or a plurality of units, maintain its working members (the plow bottoms in this case) in operative alignment, and for that purpose adjacent units will be connected together by a structure that is substantially L-shaped, and which preferably is strengthened by a diagonal brace 19, the L-shape providing an arm attachable to each unit, one arm 20 being rotatively mounted on the forward (or advanced) unit 2 to provide an axis paralleling the longitudinal axis of the unit, the other arm 21 being rotatively mounted on the adjacent rearward unit 3 providing an axis perpendicular thereto.

By this arrangement a compound coupling 22 is provided whereby the units have a certain rigidity and at the same time a certain flexibility, rigidity to propel the forward unit 2 from the rear unit 3, without effecting the operative alignment of the implement and flexibility to permit the respective units to efficiently function on uneven ground, by moving in a vertical plane about their respective axis and perpendicular to each other, whereby the implement will follow the ground surface in a like manner as on even ground.

As before mentioned the caster wheel of the advanced unit is removed and as the implement is considered as complete, whether by changing the number of plow bottoms 5 to each unit or changing the number of units, some support must be provided in lieu of the removed caster wheels, which support is substituted by utilizing a pair of journals 23 for each arm of the L structure, whereby the weight of the rear end of the forward unit is transferred to the rear unit in a manner that is obvious.

In addition to the compound coupling 22 the hitch 24 consists preferably of a tubular draft pole 25 and a tubular guide bar 26 pivotally joined together and attached to the implement, and these and their assembly will now be explained.

For the purpose of the hitch 24 a triangle is formed with one side provided by the operatively aligned implement 1 which, by means of the compound coupling 22, forms a rigid side; a second side provided by the draft pole 25 which is pivotally and rockably secured at one end to the adjusting bar (or outside unit), by a coupling head 27, and similarly at the other end to the guide bar 26 which is also rigid; and a third side formed by the said guide bar which is pivotally and rockably connected to the forward or outside end of the implement and which is pivotally attached to the outer end of the pole 25.

It is now apparent that, as the name would imply in vehicular parlance, the pole 25 is an elongated tubular member providing a means to communicate movement from the power source to the implement 1 and, as the pole is attached to the rear unit 3, it is obvious that propulsion is from the rear, i. e. that the implement is drawn from the rear.

The pole 25 is extended beyond the forward unit in the usual manner and is provided with a length adjusting means 28 on its outer end which consists of a tubular extension member 29 slidably mounted in and engaged by the said pole 25, and is provided at its outer end with a yoke 30 secured rigidly thereto and which is extended to carry a draft ring 31 in a manner to be explained.

The yoke 30 is provided with upwardly extending plates 32 and a locking bar 33, paralleling said extension member, is secured therein by a bolt 34 substantially as shown in the drawings.

The locking bar 33 preferably extends rearwardly and is provided with a guiding collar 35 which encircles the pole for sliding movement thereon and which is formed to provide upturned ends 36 for securement to the inner end of the locking bar 33, whereby the extension member 29 may be telescoped within the pole 25 and thus shorten the length of the pole, the locking bar moving with its guiding collar simultaneously on the outside of said pole.

On the extreme outer end of the tubular member forming the pole 25 is a lock 37 adapted and disposed to engage the locking bar 33 and this lock consists of a socket 38 secured to said member by spot welding or other means (not shown) and the socket has its ends extended upward to be joined together by a tie bolt for rigidity and serves as a stop for said collar 35.

A fulcrum pin 40 is passed through both the said ends and is positioned to clear the locking bar 33 and on this pin 40 is mounted an L shaped locking lever 41 in which is provided an elongated hole 42 adapted to engage this pin and compensate for a steel pin 43 which is secured in the bend of the lever 41, and which is passed for guided movement through a vertical slot 44 in said plate, being positioned therein to engage notches 45 formed in said locking bar upon movement of the lever whereby to secure the length adjusting means.

The long arm of the lever 41 extends upward at an angle and has secured to its upper end a rope 46 or cable, this rope terminating forward in reach of the operator (not shown) of the power means (not shown) for the remote control and power operation of the hitch 24 therefrom, as will now be shown.

It is now evident that when the rope 46 is tightened that the steel bolt 43 will be raised by the lever out of the notches 45 of the locking bar 41 when if the tractor is backed and the rope kept taut that the length adjusting means will telescope and the pole will be shortened, after which slacking the rope will cause the steel bolt to engage the locking bar notches by gravity and rigidly secure the pole at the desired length and in rigid alignment with the pole all without the operator leaving his position.

Reversing the operation obviously will extend the pole. In either event however the pole will maintain its rigidity.

The said yoke 30 carrying the draft ring 31 yieldingly mounted therein, consists of a rectangular boxlike frame 47 through the outer end of which the neck or stem of the ring 31 passes to engage a spring 48 mounted therein, all in the usual manner of such construction.

On one side of this box and integral therewith, is a projected plate 49 to which the guide bar 26 is pivotally mounted by means of a bolt 50 passed through the coupling head 27.

The guide bar 26 is now extended rearward in a more or less diagonal course to the adjusting bar 17 of the forward unit 2 where it is connected by the usual pin, bolt, or a clevis.

The guide bar is of fixed radius and moves in an arc about its connecting point and by its pivotal attachment to the draft ring box will control the transverse movement of the said ring as the pole length is adjusted.

It is now apparent that to change the angles of the triangle one side of the triangle must have its length altered, therefore, when the lock 37 is released as before described, the length adjusting means 28 is released and the length of the pole side of the triangle may be changed.

For instance, the hitch 24 as portrayed by the solid lines in Fig. 1, shows the draft ring 31 approximately on the normal center line of draft, while the dotted lines are intended to show the changed position of the triangle when the ring has been moved transversely, and upon shortening the length adjusting means, movement being on the arc described by the guide bar swinging on its conecting pivot 51 whence the draft ring has been moved to provide a selective line of draft.

In uneven ground and in the extensive operation of tilling the soil gravity plays an important part. Extensive operation calls for larger implements and power to operate them, and on hilly ground the length of the larger implements, providing a lever extending from the draft ring to the rearward end of the implement, together with its added weight, is ordinarily of considerable assistance to the effect of gravity in sliding down hill.

By means of the present herein described invention at no time is the hitch extended from the implement a greater distance than the length of the guide bar, and it is obvious that this bar can be relatively short, thus providing for close coupling to the implement.

It is also well known that under the usual conditions of soil that pointing the front of the plow up hill is of little avail in preventing the plow slipping and that the commonly accepted method is now to provide a caster wheel that may be adjusted at the rear end of the plow in an attempt to prevent such slipping.

With the device here described, and referring to the drawing of Fig. 1, the hitch shown in solid lines would be positioned with respect to the implement to maintain the normal line of draft, i. e. the line of draft on level ground.

Now by referring to the hitch shown dotted in the same figure it will be noted that the ring is brought closer to the implement, thereby shortening the said leverage, and as the pull is on the rear unit the inclination to slip is counteracted by the tendency of the lead unit to become a counteracting lever and to turn the implement on the pivot at the point of connection on the rear end of the pole and the adjusting bar of the rear unit.

It is therefore evident that the steeper the hill the shorter will be the radial length between the tractor and the implement, and that as all sides of the triangle are rigid that the forward unit attached substantially to the ring 31 will be absolutely under control at all times; that pulling the implement from the rear and guiding it from the front will compensate for the effect of gravity; that a selected constant average center line of draft will be maintained; and that changing from one degree of slope to another may be done expeditiously and with a minimum of manual effort.

Having thus described my invention I claim:

1. In a gravity compensating hitch, the combination with a plurality of units, extended in operative alignment, and forming an implement, of a compound coupling connecting adjacent units for propulsion, and consisting of an L-shaped structure, having one of its arms rotatively mounted on the forward unit parallel with the normal line of draft of said implement, and having the other of its arms rotatively mounted on the adjacent unit perpendicular to the normal line of draft, and disposed thereon to support the rear end of the forward unit from the rear unit, a draft pole pivotally attached at one end to the rear unit for propulsion and provided at its forward end with a length adjusting means guidedly attached to the forward unit, and means to remotely adjust the length of said pole to provide a selective line of draft.

2. In a gravity compensating hitch, the combination with a plurality of units, extended from front to rear in operative alignment, and forming an implement, of a compound coupling connecting adjacent units in operative alignment, and consisting of a structure mounted on adjacent units for rotatable movement of said units, the forward unit on an axis paralleling the normal line of draft and the rearward on an axis perpendicular to the normal line of draft, for movement of said units in a vertical plane and perpendicular to each other, a draft pole pivotally and adjustably attached at one end to the rear unit to propel said implement and provided at its forward end with a length adjusting means, guidedly attached to the forward unit, and means to remotely adjust the length of said pole to provide a selective line of draft.

3. In a gravity compensating hitch, the combination with a power drawn implement, of a rigid draft means attached to the rear of the implement and extended forwardly thereof for connection with the power source, and consisting of a pole provided with a remotely controllable and slidably mounted length adjusting means, said adjusting means consisting of an extension member controllably and slidably mounted in the pole, and provided at its outer end with a yoke adapted for attachment to a power source, a locking bar, provided with vertically positioned notches, hingedly secured to said yoke, and disposed in parallel relation to the extension member, and provided on its rearward end with a guiding collar slidably mounted on said pole, a lock rigidly secured to the outer end of the said pole and disposed with relation to said collar to provide a stop therefor, and provided with upturned ends spaced to slidably engage and guide said bar, a locking lever fulcrumed in said upturned ends and provided with a pin disposed therewith to engage a selected notch in said bar, and arranged to release said bar by a forward movement of said lever, and means attached to said lever for the remote operation thereof, said adjusting means being positioned with relation to the power source for slidable operation thereby.

WADE H. GOODMAN.